United States Patent [19]
Weinberg et al.

[11] 4,168,836
[45] Sep. 25, 1979

[54] INTERNALLY ILLUMINATED SPINDLE FOR RECORD PLAYER TURNTABLES

[75] Inventors: Harold Weinberg, Stony Brook, N.Y.; Jack Setton, Neuilly, France

[73] Assignee: Setton International Ltd., Ronkonkoma, N.Y.

[21] Appl. No.: 963,589

[22] Filed: Nov. 24, 1978

[51] Int. Cl.² .............................................. G11B 17/04
[52] U.S. Cl. .................................. 274/10 S; 274/1 R; 362/87
[58] Field of Search ................ 274/1 R, 10 S; 362/87, 362/811

[56] References Cited
U.S. PATENT DOCUMENTS 2,788,437  4/1957  Howle ..................................... 362/87

Primary Examiner—Steven L. Stephan
Attorney, Agent, or Firm—Stoll and Stoll

[57] ABSTRACT

An internally illuminated spindle for record player turntables, said illuminated spindle being adapted to guide and facilitate placement of disc records on the turntables. Secondary internal illumination may also be provided in the spindle to illuminate the label area of the disc records. The internally illuminated spindle is constructed to minimize scratching of the disc records in the event of misalignment of the records relative to the spindle when they are placed on the turntable. This construction is also feasible in the absence of illumination.

2 Claims, 10 Drawing Figures

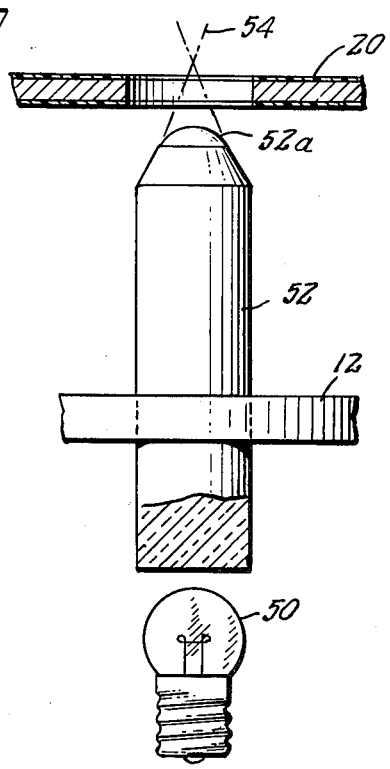
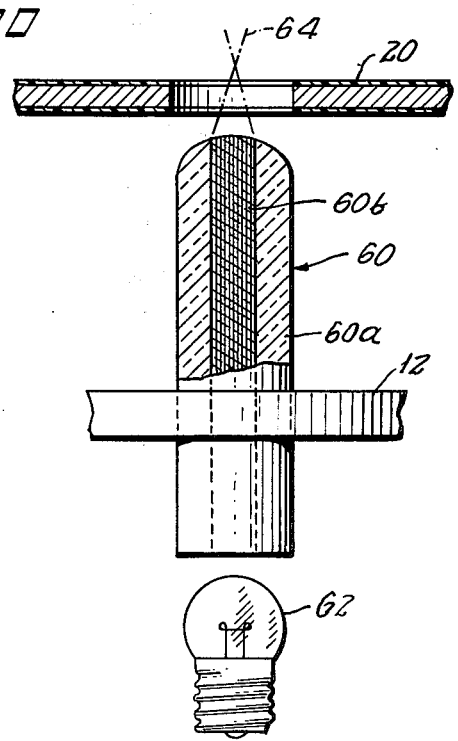

INTERNALLY ILLUMINATED SPINDLE FOR RECORD PLAYER TURNTABLES

BACKGROUND OF THE INVENTION a. Field of the Invention

The invention relates to record players provided with turntables for disc records.

b. Prior Art

Applicant is not aware of any internally illuminated turntable spindles in the record player art.

SUMMARY OF THE INVENTION

The invention provides an internally illuminated spindle for record player turntables; the illumination facilitating alignment of the record hole with the turntable spindle. Illumination may be provided by a light source mounted within the spindle or by light transmitted through the spindle or by light transmitted through the spindle from a light source located under the spindle.

For record guidance purposes, light transmitted upwardly through the tip of the spindle would suffice. For record label illumination, light focused downwardly and radially outwardly would be required. The same light source may be used for both purposes.

In one form of the invention, the light source is a small lamp mounted within a hollow spindle made of light transmitting material. In another form of the invention, the light source may be a small lamp mounted below a spindle which is made of or which embodies, light transmitting material.

In all cases, the spindle or spindle top is made of relatively soft material, so that unintentional sliding engagement between the spindle and a record will not scratch or otherwise damage the record.

BRIEF DESCRIPTION OF THE DRAWING

FIG. 9 is an exploded view partly in cross section, showing a modification of the invention.

FIG. 10 is another exploded view partly in cross section, showing a further modification of the invention.

DESCRIPTION OF PREFERRED EMBODIMENTS OF THE INVENTION

Figures 1, 5:
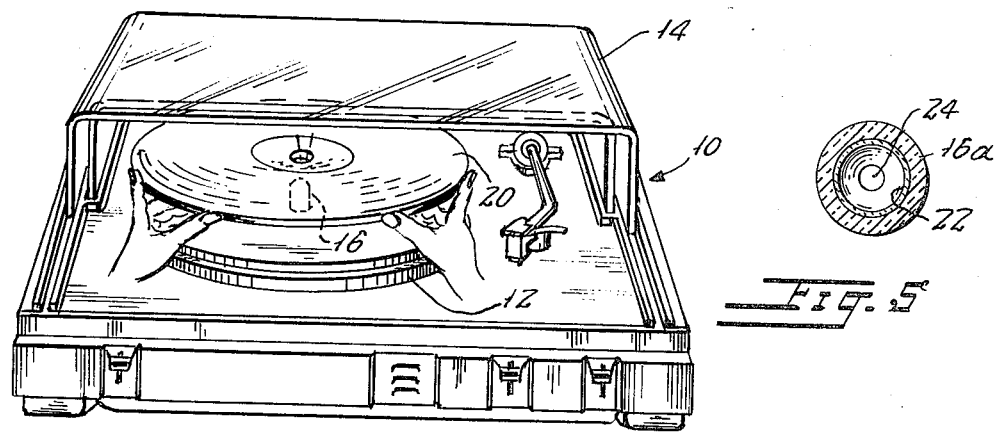
FIG. 1 is a front perspective view of a record player embodying a spindle made in accordance with this invention, showing how the invention is used.
FIG. 5 is a transverse section taken on the line 5—5 of FIG. 3.

A representative record player 10 is shown in FIG. 1 of the drawing wherein turntable 12 is conventional and cover elements 14 are described and claimed in a copending patent application. Spindle 16 in turntable 12 embodies the present invention. As shown in FIGS. 2-5, spindle 16 is a hollow body consisting of a base 16a and cap 16b screw-threaded to said base. Spindle base 16a is secured to the turntable by conventional means.

Mounted in said spindle base is a lamp 18 which is connected to the turntable power source. The spindle base and cap elements are made of light-transmitting material such as the methyl methacrylates sold under the trademark Lucite by E.I. duPont de Nemours and Company of Wilmington, Delaware, and under the trademark Plexiglass by Rohm and Haas Company of Philadelphia, Pennsylvania. Consequently, light from the lamp passes into the spindle and thereby illuminates it so that a record 20 may readily be aligned therewith. See FIG. 1.

Figures 2, 3, 4:
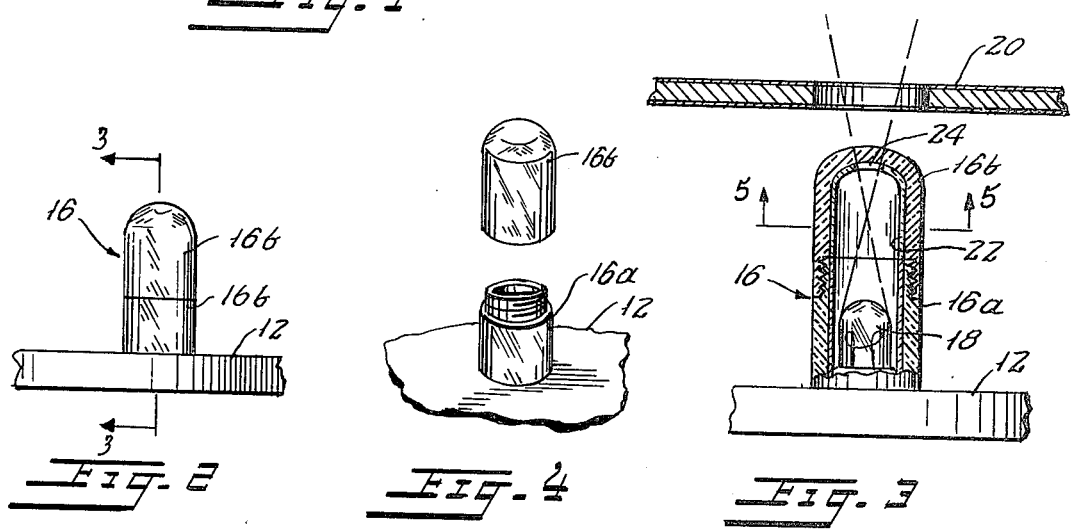
FIG. 2 is a fragmentary side view of a spindle made in accordance with this invention.
FIG. 3 is a fragmentary, enlarged vertical section taken on the line 3—3 of FIG. 2, showing a record aligned therewith.
FIG. 4 is an exploded perspective view showing the two-piece construction of the spindle illustrated in FIG. 2.

Internal illumination of the spindle is sufficient for the purpose of the invention, but projecting focused light therefrom provides more precise guidance for aligning a record with the spindle. This may be accomplished by coating the inner surface of the spindle (both the base and cap) with a reflective film 22. This may be done, for example, by vacuum plating. A small area centered at the top of the inside surface is left uncoated to form an aperture or window 24 through which a light beam 26 will project. As shown in FIG. 3, this beam provides precise guidance for aligning the record.

Figures 6, 8:
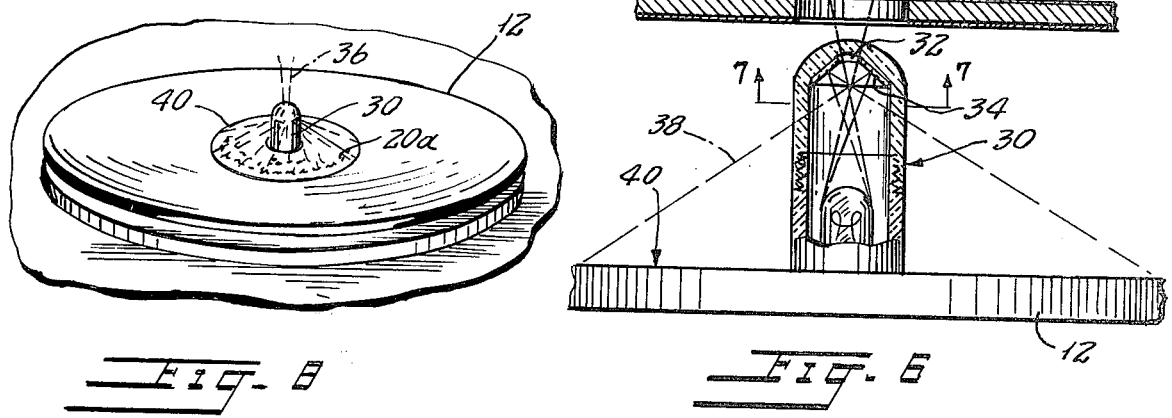
FIG. 6 is a sectional view similar to that of FIG. 3, showing a modified form of the claimed spindle.
FIG. 8 is a fragmentary perspective view of a turntable embodying the spindle of FIG. 6, showing its illumination of the label area of a record.
Figure 7:
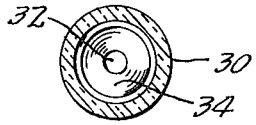
FIG. 7 is a transverse section taken on the line 7—7 of FIG. 6.

FIG. 6 shows a modification of the embodiment of FIG. 3. In FIG. 6, the inner surface of spindle 30 remains uncoated except for a generally conical area surrounding central aperture or window 32. Reflective coating 34 on said conical area forms a reflector which reflects light back to the turntable within a radius determined by the conical angle. As shown in FIG. 6, a light beam 36 projects upwardly through aperture or window 32 and the tip of the spindle, while a generally conical light beam 38 illuminates an annular, concentric area 40 on the turntable. When record 20 is centered on the turntable (FIG. 8), the record label 20a will coincide, substantially, with illuminated area 40. As a result, light beam 38 will illuminate the label.

FIG. 9 shows a modification of the invention wherein the spindle is a solid structure and the light source, lamp 50, is located externally of the spindle, specifically, below the spindle but centered therewith. Spindle 52 is a solid rod made of light transmitting material, for example, the Lucite or Plexiglas plastics above mentioned. Light from lamp 50 causes spindle 52 to become internally illuminated, thereby facilitating centering of the record relative to the turntable. To the extent that light will be transmitted radially from the spindle, the record label will be illuminated.

If desired, the outer surface of spindle 52 may be coated with a light impervious film in areas where light transmission is not desired. For example, the outer surface of the spindle, except for convex tip 52a, may be coated with such film. This convex tip will function in the manner of a convex lens and transmit a light beam 54. As has been explained, this light beam will provide guidance to center a record on the turntable.

FIG. 10 shows a modification of the embodiment of FIG. 9. Spindle 60 comprises an outer tube 60a and an inner core 60b. The outer tube may be made of light transmitting material, as above described, or it may be made of material which is not light transmitting. Inner core 60b is a fiber optics rod capable of transmitting light from an external light source 62. The result is a narrow light beam 64 which provides guidance for centering a record on the turntable.

The foregoing is illustrative of preferred forms of the invention and it will be understood that these forms may be modified and other forms may be provided within the scope of the appended claims. For example, the invention is not limited to the spindle materials and vacuum plating process above described. However, as is the case with the materials above mentioned, all substitute materials should have a lower hardness factor than the material of which the record is made.

We claim:

1. A spindle for record player turntables, comprising:
   (a) a spindle body made of light transmitting material, and
   (b) a light source adapted to transmit light through said spindle body,
   (c) the spindle body being hollow, and
   (d) the light source being a lamp disposed within the hollow spindle body,
   (e) the spindle body being provided with an annular, generally conical reflective surface at its tip encircling a light transmitting window therein,
   (f) whereby some of the light from the light source is adapted to be transmitted through said window in the form of a light beam capable of guiding the placement of a record on the turntable, and
   (g) some of the remaining light from the light source is adapted to be reflected radially outwardly and downwardly from said conical reflective surface to illuminate a label on the record placed on the turntable.

2. A spindle in accordance with claim 1, wherein:
   (a) the spindle body is made of material having a lower hardness factor than the material of which the record is made,
   (b) whereby scratching of the record by the spindle is minimized when the record is rubbed against the spindle.

* * * * *